(12) United States Patent
Kurian et al.

(10) Patent No.: US 12,346,418 B2
(45) Date of Patent: Jul. 1, 2025

(54) ANTI-PATTERN CAPTCHA

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 259 days.

(21) Appl. No.: 18/222,524

(22) Filed: Jul. 17, 2023

(65) Prior Publication Data
US 2025/0028797 A1    Jan. 23, 2025

(51) Int. Cl.
*G06F 21/31* (2013.01)

(52) U.S. Cl.
CPC .... *G06F 21/316* (2013.01); *G06F 2221/2133* (2013.01)

(58) Field of Classification Search
CPC ........................ G06F 21/316; G06F 2221/2133

USPC .......................................................... 726/18
See application file for complete search history.

(56) References Cited

U.S. PATENT DOCUMENTS

| | | | |
|---|---|---|---|
| 2023/0308460 A1* | 9/2023 | Thomas | H04L 63/102 |
| 2024/0045942 A1* | 2/2024 | Lal | G06F 21/36 |

* cited by examiner

*Primary Examiner* — Jacob Lipman
(74) *Attorney, Agent, or Firm* — Weiss & Arons LLP

(57) ABSTRACT

Systems and Method are provided for an Anti-Pattern Captcha. Methods may include AI software receiving a request from a user to access a system or website, the request comprising user credentials. Methods may include the AI software identifying a human user associated with the user credentials. Methods may include the AI software compiling data related to a plurality of unique behavior patterns associated with the human user when interacting online. Methods may include the AI software analyzing the compiled data to establish the unique behavior patterns. Methods may include the AI software presenting a challenge to the user. Methods may include the AI software verifying that the user is the human user upon a response to the challenge that deviates from at least one of the unique behavior patterns. Methods may include the AI software prompting the user to interact with the system or website upon verification.

20 Claims, 4 Drawing Sheets

ANTI-PATTERN CAPTCHA

FIELD OF TECHNOLOGY

Aspects of the disclosure relate to technology for challenge-response authentications.

BACKGROUND OF THE DISCLOSURE

A Completely Automated Public Turing test to tell Computers and Humans Apart ("Captcha") may be used in conventional systems and websites to differentiate between human users and computer programs. However, current Captchas may not be able to keep up with artificial intelligence ("AI") and/or machine learning ("ML") computer programs, which may successfully simulate a human user's behaviors.

Captchas are a type of challenge-response authentication which may be used to determine whether a user is a human. Captchas may prevent computer programs from carrying out brute force attacks. Captchas may also prevent computer programs from spamming systems or websites. Captcha challenges may make it more difficult for the computer programs to submit responses automatically and/or repeatedly. Examples of conventional Captchas may include blurring text, selecting images or presenting audio clues.

AI and ML computer programs may be designed for the sole purpose of solving conventional Captchas. AI and ML computer programs are becoming increasingly effective at solving conventional Captchas. AI and ML computer programs are also becoming increasingly popular with computer program developers.

Therefore, it would be desirable to improve Captcha technology to distinguish a human user from AI or ML computer programs simulating a human user. It would be further desirable to thwart AI and ML computer programs from executing attacks and/or spamming the system or website.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
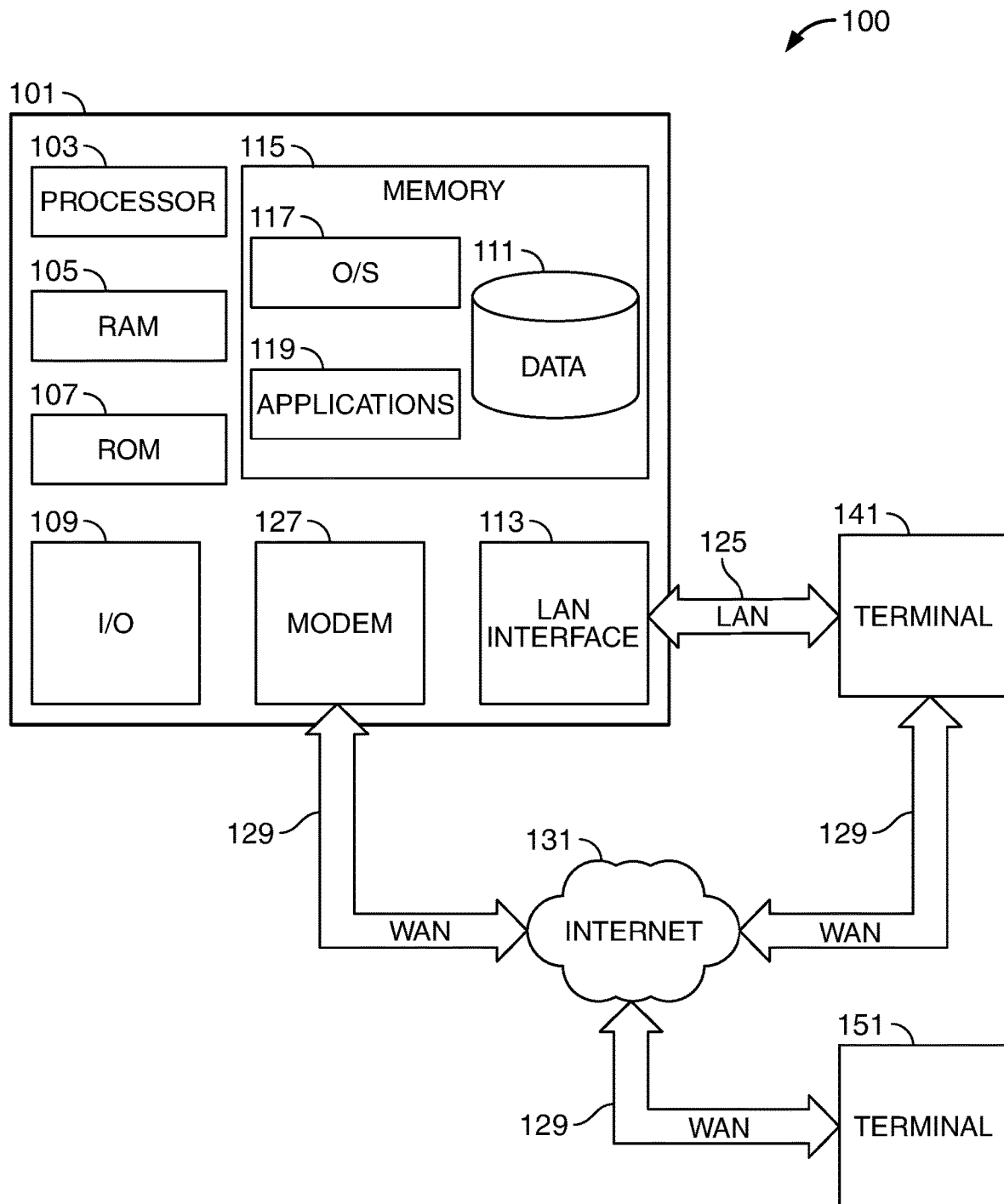
FIG. 1 shows an illustrative apparatus in accordance with principles of the disclosure.

Systems and methods are provided for providing a challenge-response authentication to verify a request by a user, the request for the purpose of interacting with a system or website. An artificial intelligence ("AI") software may receive the request. The AI software may be integrated with the system or website. The AI software may be distinct from the system or website. The AI software may communicate with the system or website. The system or website may be hosted on the cloud, a computer and/or a server. The system or website may be accessible through the internet.

The request may include a plurality of user credentials. The user credentials may include a username, a user device identity ("ID"), a user internet protocol ("IP") and/or a user input. The user input may include a password, user data and/or biometric information.

The systems and methods may include the AI software identifying a human user most closely associated with user credentials. The AI software may identify the human user by looking up the user credentials in a database and finding the human user associated with the user credentials. The AI software may have access to the database.

A system or website may require a user to create an account prior to making a request to interact with the system or website. The system or website may require the user to provide user credentials during the account creation. The system or website may also require the user to provide identifying information during the account creation. The system or website may use the identifying information to associate a human user with the account. The system or website may associate the user credentials with the human user of the account. The system or website may store the user credentials and the associated human user in a database.

The systems and methods may include AI software compiling data related to a plurality of unique behavior patterns associated with a human user when interacting online. The AI software may establish the plurality of unique behaviors using the compiled data. The data may be compiled from a database accessible to the AI software, data which is publicly available online and/or user supplied data. The data may include writing samples from the human user. The data may also include any suitable data for establishing the unique behavior patterns. The data may also include the unique behavior patterns.

AI software may analyze data and search for behavior patterns that are unique to a human user. The unique behavior patterns may include a spelling pattern, a syntax pattern, a punctuation pattern, a typing speed pattern, a typing style pattern and/or a typing cadence pattern.

The spelling pattern may include a unique spelling of a word and/or phrase. The spelling pattern may also include unique spelling errors of a word and/or phrase. The syntax pattern may include a unique placement of words and/or phrases next to each other. The syntax pattern may also include unique exclusions of words and/or phrases next to each other. The punctuation pattern may include a unique placement of punctuation next to words and/or phrases. The punctuation pattern may also include unique exclusions of punctuation next to words and/or phrases.

The typing speed pattern may include a unique range of typing speeds when performing certain typing tasks. The typing speed pattern may also include a unique range of typing speeds performed while typing certain words and/or phrases. The typing speed style may include a unique typing style. For example, the AI software may be able to determine, based on a time interval between when each key is pressed and how much pressure is placed on the key, a unique typing style of the user. The typing cadence pattern may include a unique time interval taken between typing distinct words or phrases.

The systems and methods may include AI software presenting a challenge to a user to determine that the user is a human user. The challenge may include testing whether the user is capable of deviating from at least one of a plurality of unique behavior patterns. The user may be an AI or ML computer program. The AI or ML computer program may be programmed to follow the unique behavior patterns of the human user it is trying to simulate. The AI or ML computer program may not understand it is being asked to deviate from the unique behavior patterns and would conform with the unique behavior patterns. The AI software may verify that the user is the human user based on a received response to the challenge that deviates from at least one of a plurality of unique behavior patterns. The AI software may present the challenge after establishing unique pattern behaviors of the human user.

A challenge may include prompting a user to type a phrase different from a spelling pattern, a syntax pattern and/or a punctuation pattern of a human user. For example, when a unique behavior pattern of the user includes typing a particular word with an exclamation point, the challenge may prompt the user to type that word, but also request that the user type it differently.

The challenge may include prompting a user to type a phrase that a human user cannot type within a typing speed pattern, a typing style pattern and/or a typing cadence pattern of the human user. For example, when a unique behavior pattern of the human user includes a typing speed range, the challenge may prompt the user to type something out of the ordinary, such as a long word with two capital letters interspersed in the middle of the word. A human user would have a difficult time typing such a request within the unique typing speed range. However, a computer would not fail to satisfy such a request.

The challenge may be selected based on a plurality of unique behavior patterns. The behavior patterns may have different degrees of uniqueness. The challenge may include prompting the user to deviate from the most unique behavior pattern. The challenge may also include prompting the user to deviate from a random unique behavior pattern. The challenge may also include prompting the user to deviate from two or more unique behavior patterns.

The challenge may include responding to two challenges. The challenge may include responding to any suitable number of challenges. The challenge may include responding to a first challenge and a second challenge. The first challenge may be based on a spelling pattern, a syntax pattern and/or a punctuation pattern. The second challenge may be based on a typing speed pattern, a typing style pattern and/or a typing cadence pattern.

A computer program may be used to execute brute force attacks and/or spam a system or website. The computer program may be able to trick the system or website into thinking it is a human user. The computer program may be programmed to simulate the human user. The computer program may require user credentials to interact with the system or website. The computer program may be given the user credentials by the human user. The computer program may be able to maliciously fake the user credentials. The computer program may be an AI or ML computer program. The AI or ML computer program may be able to fake user credentials, such as user input biometric information, using deepfake technology.

To prevent attacks or spamming, the system or website may require a user to respond to a challenge. The challenge may take into consideration the fact that an AI or ML computer program may be able to compile the same or similar data to AI software of the system or website. The AI or ML computer program may analyze the data to establish unique behavior patterns of the human user.

The challenge may require the user to deviate from the unique behavior pattern of the human user. The challenge may be presented without indicating to the user to deviate from the unique behavior pattern. The challenge may be presented to force a human user to depart from their unique behavior pattern without realizing this is what the challenge is forcing the human user to do. The AI or ML computer program may not be forced into the constraints of the human user. The AI or ML computer program may be programmed to simulate the human user and will respond to the challenge using the human user's unique behavior pattern. A response that conforms with the unique behavior pattern may indicate that the user is not the human user.

The systems and methods may include AI software verifying that the user is the human user upon a response to a challenge that deviates from at least one of a plurality of unique behavior patterns. The AI software may prompt the human user to interact with a system or website upon the verification. The AI software may determine that the user is not the human user upon a response to the challenge that conforms to at least one of the plurality of unique behavior patterns. The AI software may prevent the user from interacting with the system or website when it is determined that the user is not the human user.

The systems and methods may include AI software presenting a new challenge to a user upon a response to a first challenge that conforms with one of a plurality of unique behavior patterns. The user may make a mistake in responding to the first challenge and may require the new challenge to verify the user is the human user. The AI software may verify, upon a response to the new challenge that deviates from one of the plurality of unique behavior patterns, that the user is the human user and prompt the user to interact with the system or website. The AI software may determine, upon a response to the new challenge that conforms with one of the plurality of unique behavior patterns, that the user is not the human user. The AI software may prevent the user from interacting with the system or website when it is determined that the user is not the human user. The AI software may present any suitable number of new challenges to the user.

A challenge may be presented to a user before the user is allowed to interact with a system or website. The interaction may include a request to login to the system or website, a request to post content to the system or website, a request to access the system or website and/or a request to sign up for a service or account provided by the system or website. The challenge may be presented before the first interaction request, such as a request to login to or access the system or website. The challenge may also be presented before each interaction request.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps")

may include computer executable instructions for an automatic data layering program and security protocols, as well as other programs. In an embodiment, one or more programs, or aspects of a program, may use one or more AI/ML algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
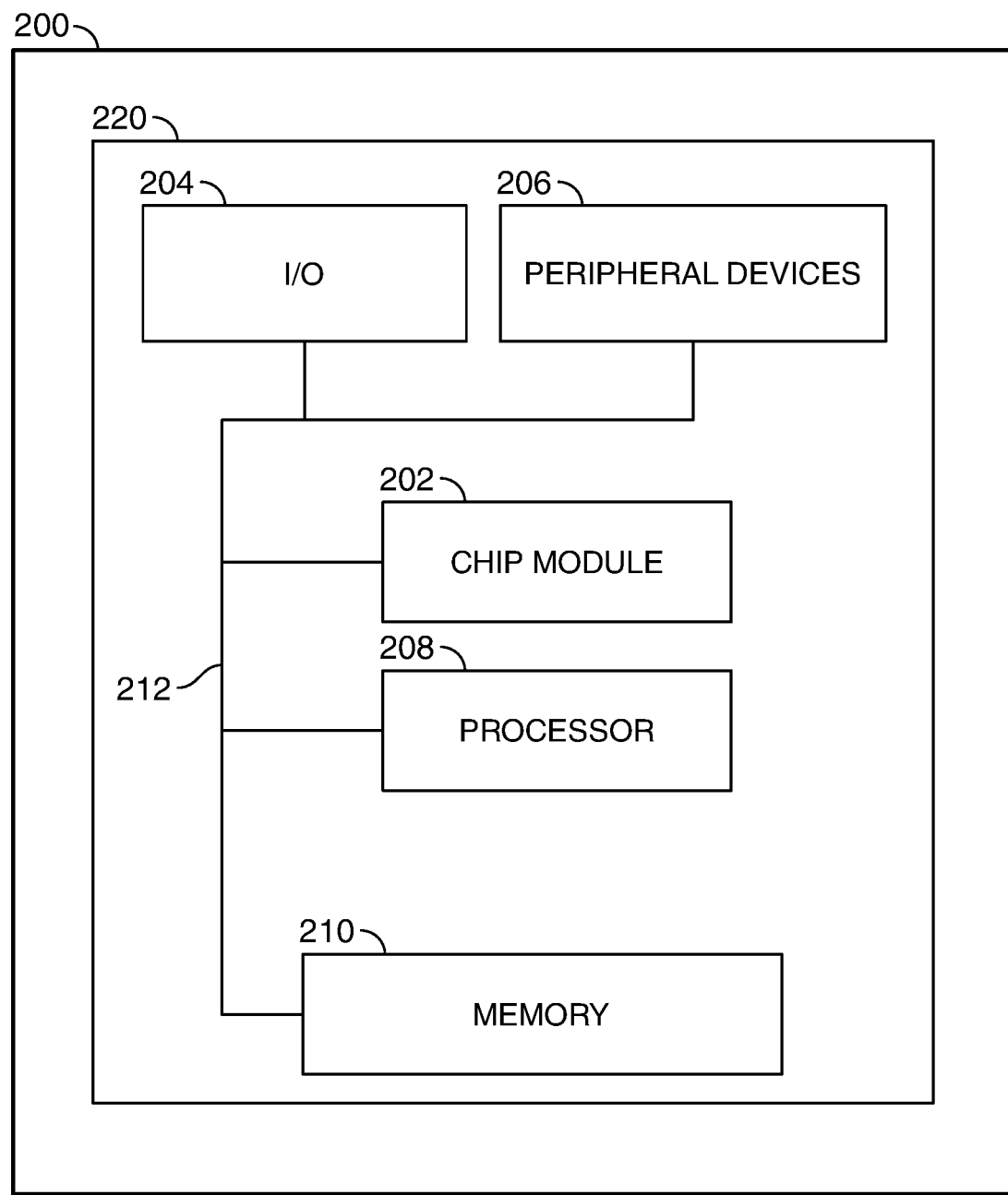
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
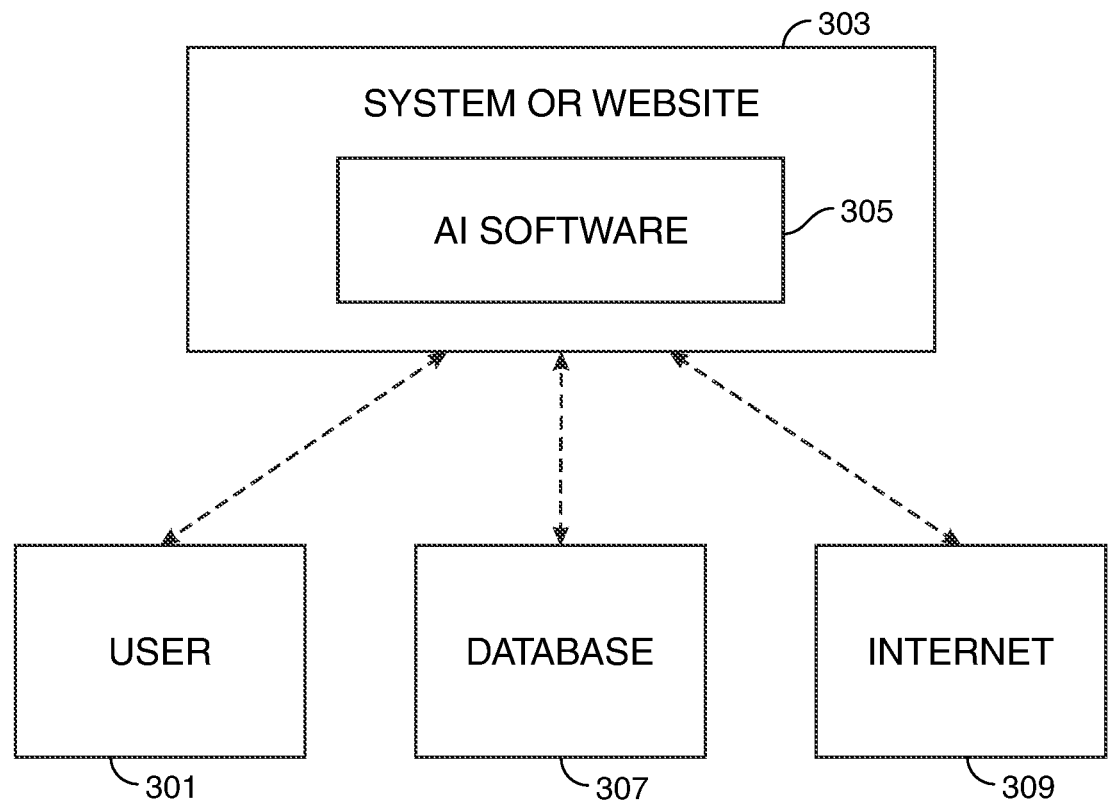
FIG. 3 shows yet another illustrative apparatus in accordance with principles of the disclosure.

FIG. 3 shows an illustrative apparatus in accordance with principles of the disclosure. User 301 may request to interact with system or website 303. The request may include a plurality of user credentials. The user credentials may include a username, a user device identity ("ID"), a user internet protocol ("IP") and/or a user input. The user input may include a password, user data and/or biometric information. User 301 may communicate with system or website 303 through the internet.

The requested interaction may include a request to login to the system or website 303, a request to post content to the system or website 303, a request to access the system or website 303 and/or a request to sign up for a service or account provided by the system or website 303. System or website 303 may include computing device 101. System or website 303 may also include AI software 305. AI software 305 may be integrated into system or website 303. AI software 305 may be separate from system or website 303.

AI software 305 may identify a human user most closely associated with user credentials. AI software 305 may identify the human user by looking up the user credentials in database 307 and finding the human user associated with the user credentials. AI software 305 may have access to database 307. Database 307 may be separate from or integrated into system or website 303. Database 307 may communicate with system or website 303 through internet 131 and/or through terminals 141/151.

AI software 305 may compile data related to a plurality of unique behavior patterns associated with a human user when interacting online. AI software 305 may establish the plurality of unique behaviors using the compiled data. The data may be compiled from database 307, data which is publicly available through internet 309 and/or user supplied data. Internet 309.

AI software 305 may present a challenge to user 301 to determine that user 301 is the human user. AI software 305 may verify that user 301 is the human user upon a response to the challenge that deviates from one of the plurality of unique behavior pattern. Once user 301 is verified, user 301 may be prompted to interact with system or website 303.

Figure 4:
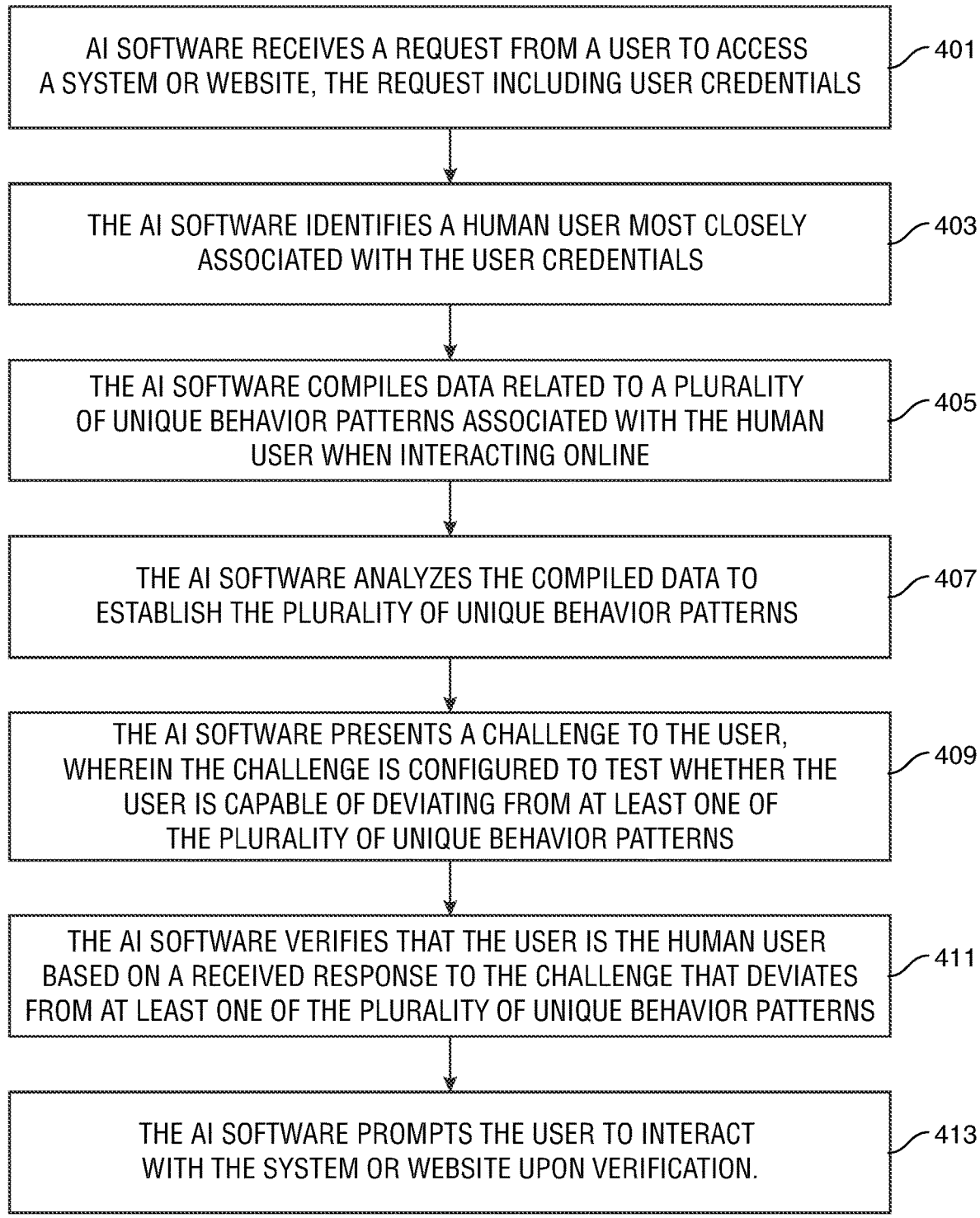
FIG. 4 shows an illustrative flowchart in accordance with principles of the disclosure.

FIG. 4 shows an illustrative flowchart in accordance with principles of the disclosure. At step 401, methods may include AI software receiving a request from a user to access a system or website, the request comprising user credentials. At step 403, methods may include the AI software identifying a human user most closely associated with the user credentials. At step 405, methods may include the AI software compiling data related to a plurality of unique behavior patterns associated with the human user when interacting online.

At step 407, methods may include the AI software analyzing the compiled data to establish the plurality of unique behavior patterns. At step 409, methods may include the AI software presenting a challenge to the user, wherein the challenge is configured to test whether the user is capable of deviating from at least one of the plurality of unique behavior patterns. At step 411, methods may include the AI software verifying that the user is the human user upon a response to the challenge that deviates from at least one of the plurality of unique behavior patterns. At step 413, methods may include the AI software prompting the user to interact with the system or website upon verification.

Thus, systems and methods for ANTI-PATTERN CAPTCHA have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing a challenge-response authentication to verify a request by a user, the request for the purpose of interacting with a system or website, the method comprising:
   receiving, at an artificial intelligence ("AI") software, the request, wherein the request comprises providing a plurality of user credentials, wherein the user credentials comprise a username, a user device identity ("ID"), a user internet protocol ("IP") address and a user input;
   identifying a human user most closely associated with the user credentials, by the AI software, wherein the human user is identified by looking up, in a first database accessible by the AI software, the human user associated with the user credentials;
   compiling data, by the AI software, related to a plurality of unique behavior patterns associated with the human user when interacting online;
   analyzing, by the AI software, the compiled data to establish the plurality of unique behavior patterns associated with the human user;
   presenting, by the AI software, a challenge to the user to determine that the user is the human user, wherein the challenge is configured to test whether the user is capable of deviating from at least one of the plurality of unique behavior patterns;
   verifying, by the AI software, the user is the human user based on a response to the challenge that deviates from at least one of the plurality of unique behavior patterns; and
   prompting the user to interact with the system or website upon verifying that the user is the human user.

2. The method of claim 1, wherein the AI software compiles the data from at least one of the first database, publicly available online data and user supplied data.

3. The method of claim 1, wherein the challenge-response authentication is a Completely Automated Public Turing test to tell Computers and Humans Apart ("Captcha").

4. The method of claim 1, wherein upon a response to the challenge that conforms with one of the plurality of unique behavior patterns, the AI software determines that the user is not the human user and prevents the user from interacting with the system or website.

5. The method of claim 1, wherein:
   upon a response to the challenge that conforms with one of the plurality of unique behavior patterns, the AI software presents a new challenge to the user;
   upon a response to the new challenge that deviates from one of the plurality of unique behavior patterns, the AI software determines that the user is the human user and prompts the user to interact with the system or website; and
   upon a response to the new challenge that conforms with one of the plurality of unique behavior patterns, the AI software determines that the user is not the human user and prevents the user from interacting with the system or website.

6. The method of claim 1, wherein the request comprises: a request to login to the system or website, a request to post content to the system or website, a request to access the system or website or a request to sign up for a service or account provided by the system or website.

7. The method of claim 1, wherein the challenge is presented without indicating the verifying requires the response to deviate from one of the plurality of unique behavior patterns.

8. The method of claim 1, wherein the plurality of unique behavior patterns comprise at least two patterns related to: a spelling pattern, a syntax pattern, a punctuation pattern, a typing speed pattern, a typing style pattern and a typing cadence pattern.

9. The method of claim 8, wherein the challenge comprises prompting the user to type a phrase different from the spelling pattern, the syntax pattern, or the punctuation pattern.

10. The method of claim 8, wherein the challenge comprises prompting the user to type a phrase that the human user cannot type within the typing speed pattern, the typing style pattern or the typing cadence pattern.

11. One or more non-transitory computer-readable media storing computer-executable instructions, which when executed by a processor on a computer system, perform a method for providing a challenge-response authentication to verify a request by a user, the request for the purpose of interacting with a system or website, the method comprising:
   receiving, at an artificial intelligence ("AI") software, the request, wherein the request comprises providing a plurality of user credentials, wherein the user credentials comprise a username, a user device identity ("ID"), a user internet protocol ("IP") address and a user input;
   identifying a human user most closely associated with the user credentials, by the AI software, wherein the human user is identified by looking up, in a first database accessible by the AI software, the human user associated with the user credentials;
   compiling data, by the AI software, related to a plurality of unique behavior patterns associated with the human user when interacting online;
   analyzing, by the AI software, the compiled data to establish the plurality of unique behavior patterns associated with the human user;
   presenting, by the AI software, a challenge to the user to determine that the user is the human user, wherein the challenge is configured to test whether the user is capable of deviating from at least one of the plurality of unique behavior patterns;
   verifying, by the AI software, the user is the human user based on a response to the challenge that deviates from at least one of the plurality of unique behavior patterns; and
   prompting the user to interact with the system or website upon verifying that the user is the human user.

12. The media of claim 11, wherein the AI software compiles the data from at least one of the first database, publicly available online data and user supplied data.

13. The media of claim 11, wherein the challenge-response authentication is a Completely Automated Public Turing test to tell Computers and Humans Apart ("Captcha").

14. The media of claim 11, wherein upon a response to the challenge that conforms with one of the plurality of unique behavior patterns, the AI software determines that the user is not the human user and prevents the user from interacting with the system or website.

15. The media of claim 11, wherein:
upon a response to the challenge that conforms with one of the plurality of unique behavior patterns, the AI software presents a new challenge to the user;
upon a response to the new challenge that deviates from one of the plurality of unique behavior patterns, the AI software determines that the user is the human user and prompts the user to interact with the system or website; and
upon a response to the new challenge that conforms with one of the plurality of unique behavior patterns, the AI software determines that the user is not the human user and prevents the user from interacting with the system or website.

16. The media of claim 11, wherein the request comprises: a request to login to the system or website, a request to post content to the system or website, a request to access the system or website or a request to sign up for a service or account provided by the system or website.

17. The media of claim 11, wherein the challenge is presented without indicating the verifying requires the response to deviate from one of the plurality of unique behavior patterns.

18. The media of claim 11, wherein the plurality of unique behavior patterns of the human user comprise at least two patterns related to: a spelling pattern, a syntax pattern, a punctuation pattern, a typing speed pattern, a typing style pattern and a typing cadence pattern.

19. The media of claim 18, wherein the challenge comprises prompting the user to type a phrase different from the spelling pattern, the syntax pattern, or the punctuation pattern.

20. The media of claim 18, wherein the challenge comprises prompting the user to type a phrase that the human user cannot type within the typing speed pattern, the typing style pattern or the typing cadence pattern.

* * * * *